United States Patent
Simitsis et al.

(10) Patent No.: US 9,824,122 B2
(45) Date of Patent: Nov. 21, 2017

(54) REQUESTS FOR SOURCE CODE TEXT

(71) Applicant: Hewlett-Packard Development Company, L.P., Houston, TX (US)

(72) Inventors: Alkiviadis Simitsis, Santa Clara, CA (US); Georgia Koutrika, Palo Alto, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 783 days.

(21) Appl. No.: 13/832,644

(22) Filed: Mar. 15, 2013

(65) Prior Publication Data
US 2014/0280110 A1    Sep. 18, 2014

(51) Int. Cl.
*G06F 17/30* (2006.01)

(52) U.S. Cl.
CPC .... *G06F 17/3053* (2013.01); *G06F 17/30864* (2013.01)

(58) Field of Classification Search
CPC ............. G06F 17/3053; G06F 17/30864
USPC ............. 707/722, 723, 728, 741, 771, 779
See application file for complete search history.

(56) References Cited

U.S. PATENT DOCUMENTS

| | | | |
|---|---|---|---|
| 6,144,958 A * | 11/2000 | Ortega et al. | |
| 6,446,064 B1 | 9/2002 | Livowsky | |
| 7,389,224 B1 | 6/2008 | Elworthy | |
| 7,774,198 B2 | 8/2010 | Roulland et al. | |

OTHER PUBLICATIONS

Oleksandr Panchenko, Hybrid storage for enabling fully-featured text search and fine-grained structural search over source code, 2009, IEEE, 37-40.*

R. Witte et al., Text mining and software engineering: an integrated source code and document analysis approach, 2008, IEEE, vol. 2, 3-16.*

E. Kaufmann and A. Bernstein, "Evaluating the Usability of Natural Language Query Languages and Interfaces to Semantic Web Knowledge Bases," 2010, pp. 1-26, Posted at the Zurich Open Repository and Archive, University of Zurich, Available at: <zora.uzh.ch/44850/4/JWS_NLPV.pdf>.

Mark Vickers, "Ontology-Based Free-Form Query Processing for the Semantic Web," A Thesis Proposal Presented to the Department of Computer Science Brigham Young University, Dec. 2005, pp. 1-19.

Neelu Nihalani et al., "Design of intelligent Layer for Flexible Querying in Databases," International Journal on Computer Science and Engineering, 2009, pp. 30-39, vol. 1(2), Available at: <arxiv.org/ftp/arxiv/papers/0912/0912.2282.pdf>.

Valentin Tablan et al., "A Natural Language Query Interface to Structured Information," 2008, pp. 1-15, Department of Computer Science, University of Sheffield, Sheffield, UK.

A. Kokkalis et al. "Logos: a system for translating queries into narratives". In SIGMOD, 2012, 4 pages.

A. Siniitsis and Y. E. Ioannidis, "DBMSs Should Talk Back Too", in CIDR, 2009, 8 pages.

(Continued)

*Primary Examiner* — Jean B Fleurantin (57) ABSTRACT

Disclosed herein are a system, non-transitory computer readable medium and method for fulfilling requests for source code. A description is associated with each section of source code text. A section of source code, whose description at least partially matches a source code request, is obtained and displayed.

13 Claims, 5 Drawing Sheets

(56) References Cited

OTHER PUBLICATIONS

G. Koutrika, A. Simitsis, and Y. E. Ioannidis, Explaining structured queries in natural language. In ICDE, 2010, 12 pages.

M. Minock, C-Phrase: A system for building robust natural language interfaces to databases. DKE, 2010, 19 pages.

N. Khoussainova, M. Baiazinska, W. Gatterbauer, Y. Kwon, and D. Suciu. "A Case for a Collaborative Query Management System", in CIDR, 2011, 7 pages.

* cited by examiner

ASSOCIATE EACH SECTION OF SOURCE
CODE WITH A DESCRIPTION
202

DISPLAY EACH SECTION OF SOURCE CODE
WHOSE DESCRIPTION AT LEAST PARTIALLY
MATCHES A REQUEST FOR A PARTICULAR
TYPE OF SOURCE CODE
204

REQUESTS FOR SOURCE CODE TEXT

Source code contains a collection of high level computer instructions that may be readable by humans. Some source code may be re-used and incorporated into other programming modules. For example, some predefined objects, functions or queries may be imported into another program.

DETAILED DESCRIPTION

As noted above, some source code may be re-used and incorporated into other programming modules. Software developers may query leading commercial search engines to obtain recyclable source code. However, conventional search engines may compare key words in the query to the actual source code text. Unfortunately, the functionality of the source code may not be discernable from the source code text. That is, the source code may be written in a non-descriptive manner using cryptic programming language expressions. Thus, the source code may not be comparable to a query or request written by a human user. Furthermore, there may be smaller more precise sections of source code that may be beneficial to a user's search, but may be difficult to detect using conventional search tools.

In view of the foregoing, disclosed herein are a system, non-transitory computer readable medium, and method to fulfill requests for source code. In one example, a natural language description may be associated with each section of source code. In a further example, a section of source code, whose description at least partially matches a source code request, may be obtained and displayed. Rather than comparing the language of a user submitted request to cryptic source code expressions, the request may be compared to a natural language description of the source code expressions. Thus, the techniques disclosed herein may increase the likelihood of finding a particular type of source code notwithstanding the cryptic nature thereof. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
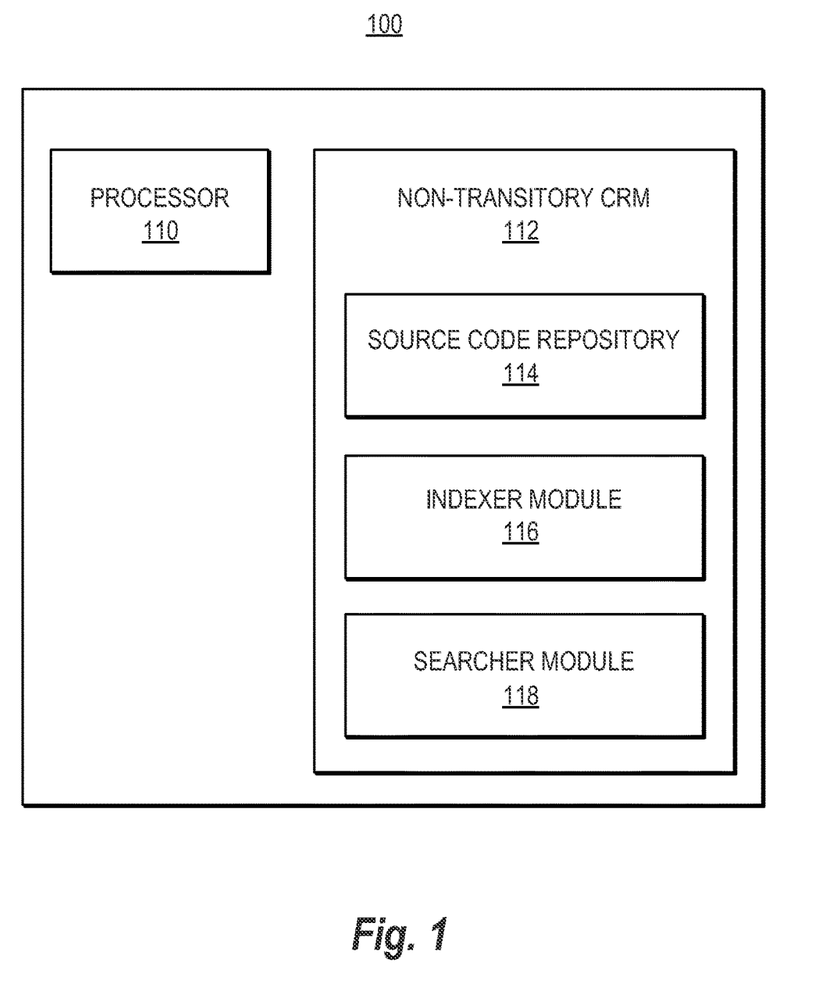
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network.

The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be described in more detail below, the instructions may include an indexer module 116 and a searcher module 118. Furthermore, non-transitory CRM 112 may include a source code repository 114 that may be accessed by processer 110. In one example, non-transitory CRM 112 may be used by or in connection with any instruction execution system that can fetch or obtain the logic from non-transitory CRM 112 and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Source code repository 114 may be utilized to store source code text and its associations with natural language descriptions. The architecture of source code repository 114 is not limited by any particular data structure. The data may be stored in volatile or non-volatile computer registers; in a relational database as a table having a plurality of different fields and records; XML or JSON documents; graph or array structures; or flat source code text files. Furthermore, source code repository 114 may also be stored in a cloud system. In one example, the source code text may comprise a plurality of sections. As will be explained further below, each section of text may correspond to a source code template. Indexer module 116 may instruct processor 110 to associate each section with a descriptor that may comprise a natural language description of a respective section. In a further example, searcher module 118 may instruct processor 110 to read a request for a particular type of source code and to obtain each section of the stored source code text whose descriptor at least partially matches the request. Each section obtained by searcher module 118 may be adaptable for producing at least some of the type of source code requested.

In addition to the modules shown in FIG. 1, another example may include a source code analyzer which may instruct processor 110 to delineate each section in the source code text. In one aspect, each delineated section of text may be substantially similar to a predefined source code template. In yet a further example, a ranking module may instruct processor 110 to rank each section obtained by searcher module 118 in accordance with a similarity between the request and the description associated with each displayed section.

Figure 2:
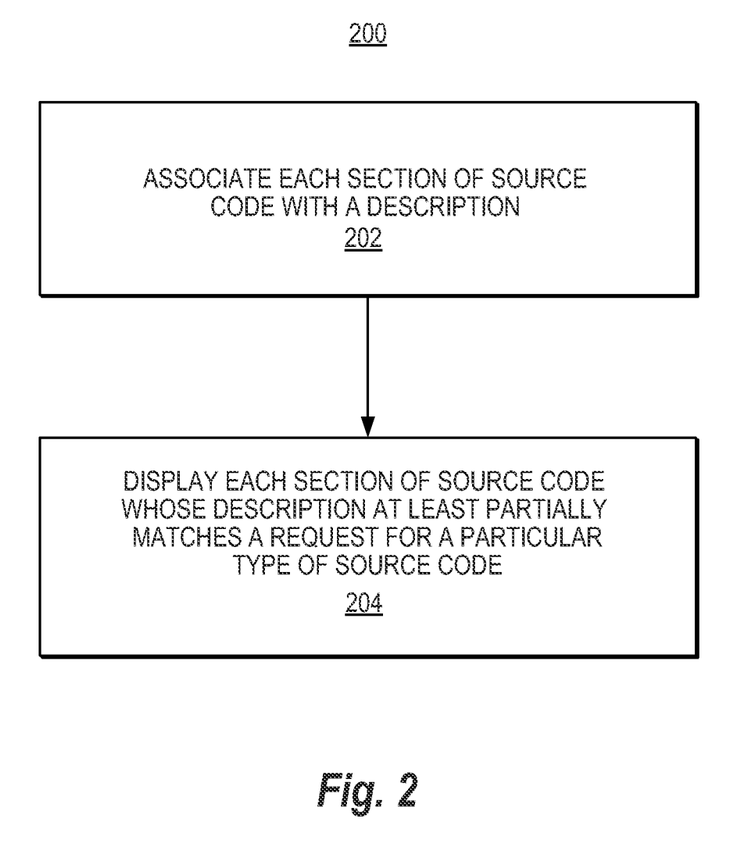
FIG. 2 is a flow diagram of an example method in accordance with aspects of the present disclosure.
Figure 3:
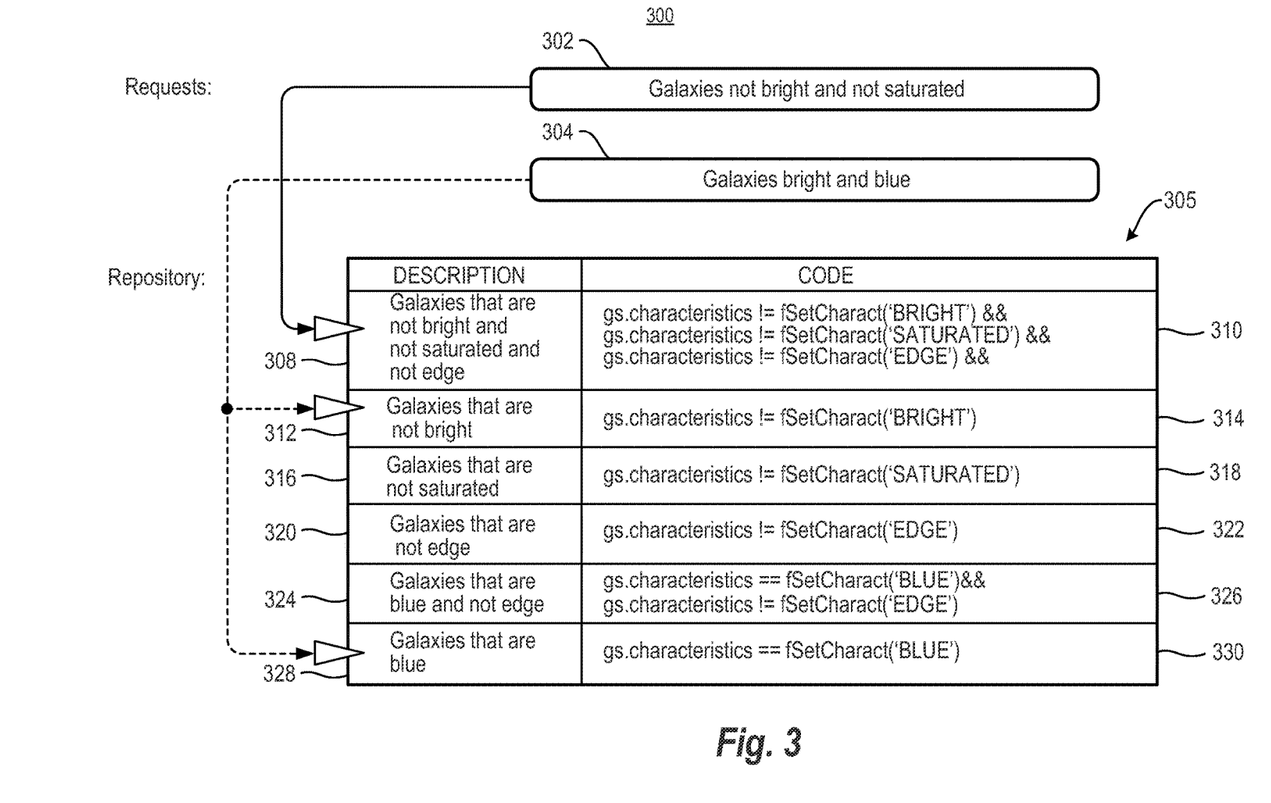
FIG. 3 is a working example of source code sections being obtained in response to a user request.
Figure 4:
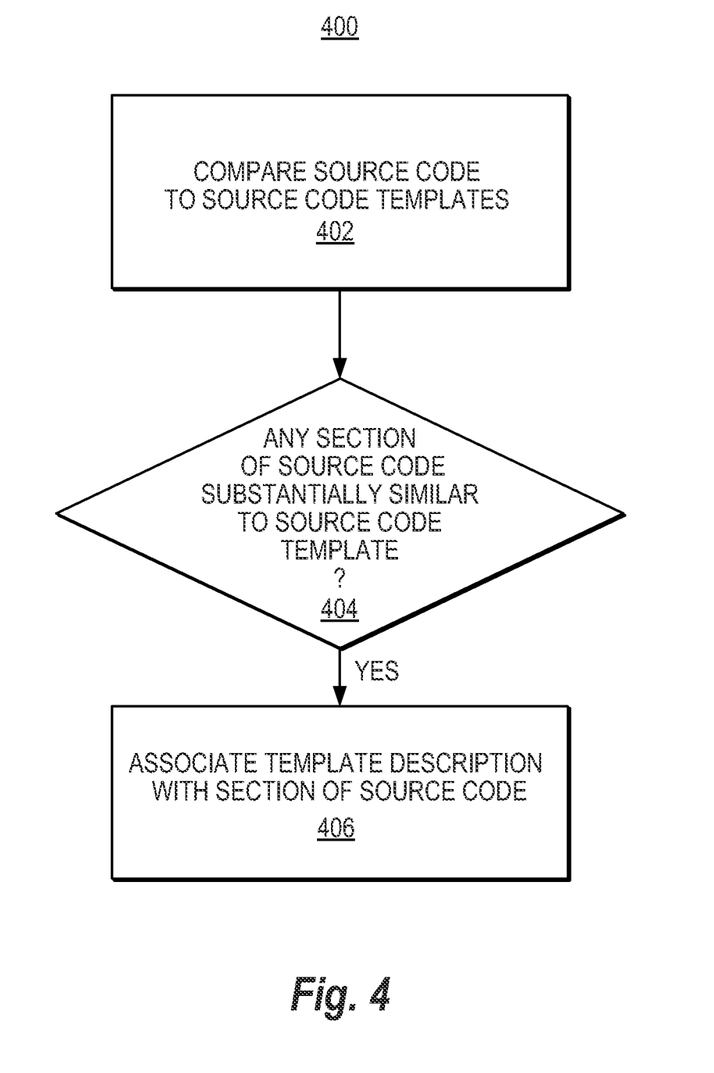
FIG. 4 is a flow diagram of a further example method in accordance with aspects of the present disclosure.
Figure 5:
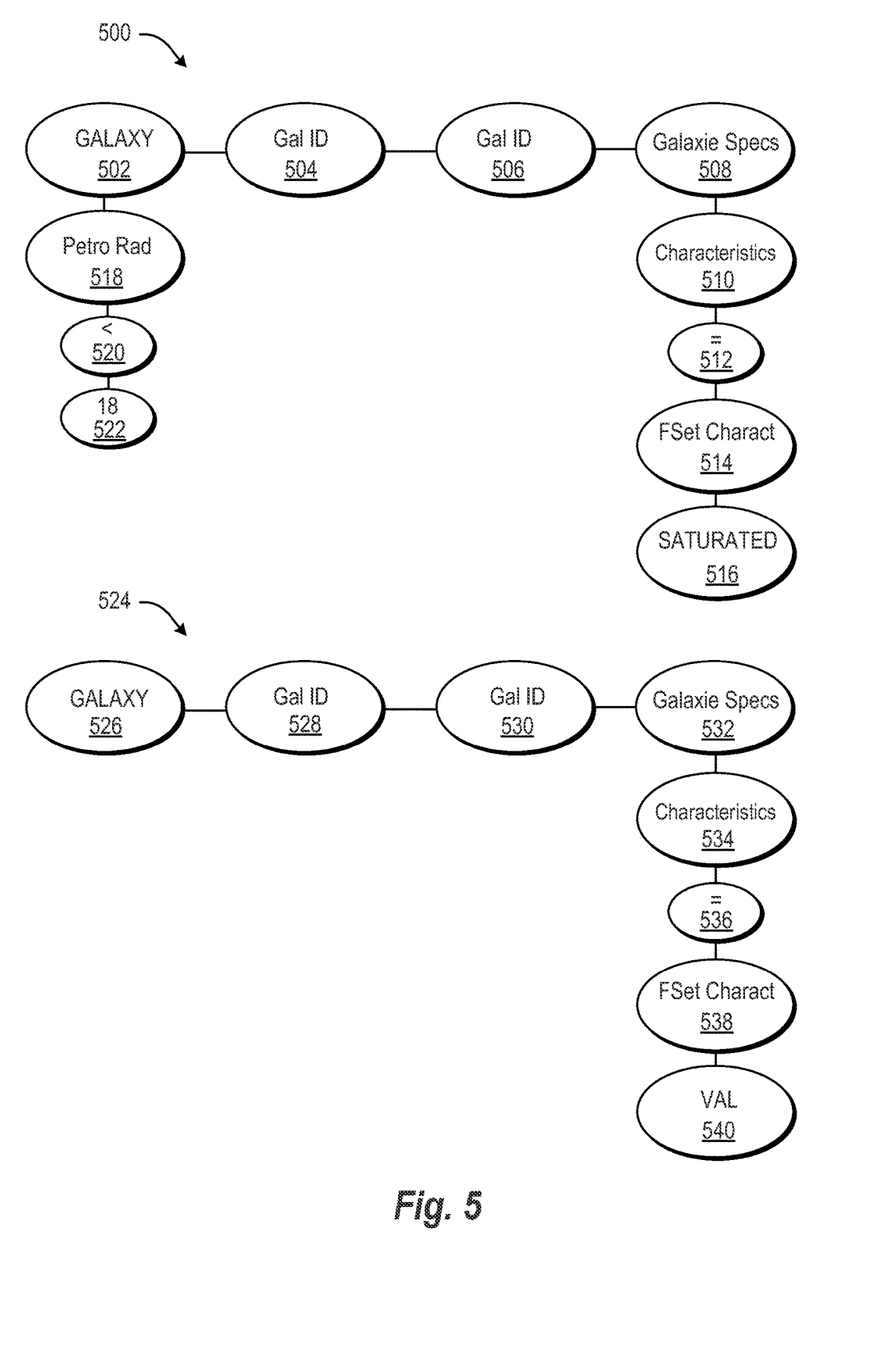
FIG. 5 is a working example of natural language generation in accordance with aspects of the present disclosure.

Working examples of the system, method, and non-transitory computer-readable medium are shown in FIGS. 2-5. In particular, FIG. 2 illustrates a flow diagram of an example method for handling requests for source code in accordance with the techniques herein. FIG. 3 is a working example of the method shown in FIG. 2. FIG. 4 is a flow diagram of an example method for generating natural language descriptions for sections of source code. FIG. 5 shows a working example of the flow diagram in FIG. 4.

As shown in block 202 of FIG. 2, each section of source code may be associated with a description. In one example, the source code may comprise database queries and each section may comprise a query construct. Referring now to the example of FIG. 3, table 305 is an example data structure that may be stored in source code repository 114. Such a table may be generated in accordance with techniques discussed further below and graphically illustrated in FIG. 4. Source code sections 310, 314, 318, 322, 326, and 330 are sections of a database query or query constructs written in structured query language ("SQL"). These source code sections may be fragments of different expressions located across different source code files, tables, etc. Each of these source code sections may be associated with a natural language description 308, 312, 316, 320, 324, and 328 respectively. Each descriptor may describe the functionality of each associated section in a natural language such that it is more readily comparable to a request entered by a human user.

Referring back to FIG. 2, each section of source code whose description at least partially matches a request may be obtained, as shown in block 204. Referring back to FIG. 3, source code request 302 and source code request 304 may be interpreted as requests for a particular type of source code that, when executed in a computer, performs a particular action or task. In source code request 302, the particular action is to obtain information regarding galaxies that are not bright and not saturated. In source code request 304, the particular action is to obtain information regarding galaxies that are bright and blue. While the requests shown in FIG. 3 are phrases with keywords, in another example, a request may be a complete sentence written in a natural language. In yet a further example, a request may comprise a combination of phrases and source code templates. For example, a user may enter the following request: "galaxies, saturated, <HAVING distance from earth > XXX>" (> stands for 'greater than'). In this instance, the keywords in the request may be compared to the natural language description and the code template in the request may be compared to source code sections.

With regard to source code request 302, certain keywords may be parsed therefrom (e.g., "galaxies," "not bright" and "not saturated"). These parsed keywords partially match natural language description 308; thus, the source code section associated therewith (i.e., source code section 310) may be displayed to the requester. Since the source code is not an exact match (i.e., the returned code contains an extra condition requiring galaxies that are not "EDGE"), the user may edit the code accordingly.

Regarding source code request 304, the language therein at least partially matches descriptor 312 and descriptor 328. The source code sections associated with these two descriptors (i.e., source code section 314 and source code section 330 respectively) may be displayed to a user. As with source code request 302, these source code sections are not an exact match (i.e., descriptor 312 recites "Galaxies that are not bright"), but they may be edited to produce the type of source code sought out by the requestor. In a further example, each obtained section of source code text may be ranked in accordance with the similarity between the request and the natural language description of each section. In one example, the similarity may be measured using a similarity function, such as a cosine similarity function.

FIG. 4 is an example method for generating the descriptions and associations shown in table 305 of FIG. 3. As shown in block 402, source code text may be compared to predefined source code templates. The source code templates may be predefined based on prior usage of source code sections or fragments. Source code usage may be observed such that source code sections whose usage exceeds a predetermined threshold are set aside and converted to a template. The newly defined templates may be stored and associated with a natural language description by an administrator of source code repository 114. As will be explained in more detail further below, any constants appearing in the predefined templates may be converted into variables. The templates may then be subsequently compared to actual source code text in a variety of ways, such as comparing the text directly. In another example, graph data structures may be utilized to compare the text. Thus, each node in a graph data structure may represent a component of the source code and an association between a pair of nodes may represent a relationship between a pair of source code components. By way of example, graph 500 of FIG. 5 may represent the following SQL source code:

SELECT TOP 1000 galID
FROM galaxy g, galaxySpecs gs
WHERE g.galID=gs.galID
AND gs.characteristics=fSetCharact('SATURATED')
AND g.petroRad<18

Each node of graph 500 of FIG. 5 may represent a component of the above query and each edge or association between a pair of nodes may represent a relationship between a pair of query components. In graph 500, the node 502 may represent the table "galaxy" shown in the "FROM" clause above and node 504 may represent the field "galID" belonging to the table "galaxy." Node 508 may represent the second table shown above, "galaxySpecs," and node 506 may represent the field galID belonging to the table "galaxySpecs." In this example, the tables "galaxy" and "galaxyspecs" are joined via the "galID" field that is common to both tables. Graph 500 represents this join by associating nodes 504 and 506. Node 518 represents the second field of table "galaxy" shown above, "petroRad;" node 520 represents the "<" symbol shown in the predicate of the query and node 522 represents the constant "18." Node 510 represents the field named "characteristics," which belongs to table galaxySpecs; node 512 represents the "=" symbol; node 514 represents the function "fSetCharact"; and, node 516 represents the constant parameter "SATURATED."

Graph 524 may represent the following predefined source code template:
"g.galID=gs.galID AND gs.characteristics=fSetCharact('+val+')"

In the template above, "val" is a variable whose value may be specified in source code that substantially matches the template. The above template may be associated with a predefined natural language description, "galaxies that are '+VAL'." In graph 524, node 526 represents the table "galaxy;" node 528 represents the field "galID" belonging to the table "galaxy;" node 530 represents the "galID" field belonging to the table "galaxyspecs;" node 532 represents the table "galaxyspecs;" node 534 represents the field named "characteristics" belonging to the table "galaxyspecs;" node 536 represents the "=" symbol; node 538 represents the function "fSetCharact"; and, node 540 represents the variable "VAL," which is a variable parameter for the function "fSetCharact."

Referring back to FIG. 4, it may be determined if any section of source code is substantially similar to a source code template, as shown in block 404; if any section of the source code is substantially similar to a source code template, the section of source code may be associated with the template's description, as shown in block 406. Referring back to FIG. 5, the series of nodes 502, 504, 506, 508, 510, 512, 514, and 516 is similar to the series of nodes in graph 524. As such, the section of the query corresponding to nodes 502, 504, 506, 508, 510, 512, 514, and 516 may be associated with the description "galaxies that are saturated," such that the template variable "val" is replaced by the query constant "SATURATED." That is, the variable "val" in node 540 is set to the constant "SATURATED" in node 516.

Advantageously, the foregoing system, method, and non-transitory computer readable medium serves source code queries or requests with more precise results. Rather than comparing an incoming query to cryptic source code expressions, the queries are compared to natural language descriptions of the code. In this regard, descriptions may be generated for smaller sections of source code that may be adaptable for producing at least some of the type of source code requested. Furthermore, the techniques disclosed herein may accommodate a request for source code by returning multiple fragments of code from multiple source code expressions. In turn, the requester may combine or edit these multiple fragments as needed. These multiple sections may originate from different code expressions and may be displayed in an order that is in accordance with the similarity between the requests and the descriptions. Thus, if the request can be partially met with smaller sections of source code (e.g., s1 and s2), but a third section cannot be found, then the response to the request may contain an ordered combination of code sections as follows: s1, missing-part, s2. The user may subsequently complete the missing portion. As such, the system, non-transitory computer readable medium, and method disclosed herein may assist a developer of computer software and promotes more efficient software development.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
   a repository to store source code text, the source code text comprising a plurality of sections;
   an indexer module which, if executed, instructs at least one processor to associate each section with a descriptor comprising a natural language description of a respective section,
      wherein to associate each section with the descriptor, a source code analyzer which, if executed, instructs the at least one processor to delineate each section in the source code text, wherein each delineated section of the source code text is substantially similar to a predefined source code template; and
   a searcher module which, if executed, instructs the at least one processor to read a request for a particular type of source code and to obtain each section of the stored source code text whose descriptor at least partially matches the request, each obtained section being adaptable for producing at least some of the type of source code requested.

2. The system of claim 1, wherein the source code text comprises database queries and each section comprises a database query construct.

3. The system of claim 1, wherein the source code analyzer, if executed, further instructs the at least one processor to generate the descriptor for each section.

4. The system of claim 1, further comprising, a ranking module which, if executed, instructs the at least one processor to rank each obtained section in accordance with a similarity between the request and the descriptor associated with each displayed section.

5. A non-transitory computer readable medium having instructions therein which, if executed, cause at least one processor to:
   generate a natural language description for each section of text in a plurality of source code files, wherein to generate the natural language description for each section, the at least one processor is to delineate each section of the source code text in the source code files, wherein each delineated section of the source code text is substantially similar to a predefined source code template;
   parse a request for a particular type of source code text that specifies a particular action to be performed by a computer; and
   obtain each section of text whose description at least partially matches the parsed request, each obtained section being adaptable for generating at least some of the type of source code text requested.

6. The non-transitory computer readable medium of claim 5, wherein the source code files comprise database queries and each section of the source code text comprises a database query construct.

7. The non-transitory computer readable medium of claim 5, wherein the instructions therein, if executed, further instruct the at least one processor to rank each obtained section of the source code text in accordance with a similarity between the request and the natural language description of each obtained section of the source code text.

8. A method comprising:
   generating, using at least one processor, a descriptor for each section of text in a plurality of source code text files stored in a repository;
   accessing, using the at least one processor, a search request for source code that performs a particular task when executed by a computer; and displaying, using the at least one processor, each of the sections of text whose descriptor at least partially matches keywords in the search request, the displayed sections being adaptable for constructing at least part of the requested source code.

9. The method of claim 8, wherein the source code text files comprise database queries and each section of text comprises a database query construct.

10. The method of claim 8, further comprising delineating, using the at least one processor, each of the sections of text in the source code files.

11. The method of claim 10, wherein each delineated section of text is substantially similar to a predefined source code template.

12. The method of claim 8, wherein the descriptor comprises a natural language description of each of the sections of text associated therewith.

13. The method of claim 8, further comprising ranking, using the at least one processor, each displayed section of text in accordance with a similarity between the request and the descriptor associated with each displayed section of text.

* * * * *